US012460613B2

United States Patent

Tsushima et al.

(10) Patent No.: US 12,460,613 B2

(45) Date of Patent: Nov. 4, 2025

(54) ENGINE DEVICE INCLUDING AN ORIENTATION OF A FUEL RETURN LINE ATTACHED TO A COMMON RAIL

(71) Applicant: Yanmar Co., Ltd., Osaka (JP)

(72) Inventors: Kohei Tsushima, Osaka (JP); Masataka Uchibori, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 60 days.

(21) Appl. No.: 16/497,742

(22) PCT Filed: Nov. 29, 2017

(86) PCT No.: PCT/JP2017/042862

§ 371 (c)(1),
(2) Date: Sep. 25, 2019

(87) PCT Pub. No.: WO2018/179583

PCT Pub. Date: Oct. 4, 2018

(65) Prior Publication Data

US 2021/0123404 A1 Apr. 29, 2021

(30) Foreign Application Priority Data

Mar. 27, 2017 (JP) ............................ JP2017-061510

(51) Int. Cl.
*F02M 39/00* (2006.01)
*F02M 26/17* (2016.01)
(Continued)

(52) U.S. Cl.
CPC .......... *F02M 63/025* (2013.01); *F02M 26/17* (2016.02); *F02M 35/10222* (2013.01);
(Continued)

(58) Field of Classification Search
CPC .. F02M 63/025; F02M 63/0275; F02M 26/17; F02M 35/10222; F02M 37/0052; F02M 55/025; F02M 2200/857
See application file for complete search history.

(56) References Cited

U.S. PATENT DOCUMENTS 5,819,711 A * 10/1998 Motose ................ F02B 61/045 123/456
5,915,363 A * 6/1999 Iwata .................... F02B 61/045 123/497
(Continued)

FOREIGN PATENT DOCUMENTS

DE 19741532 A1 12/2008
EP 2253831 A1 11/2010
(Continued)

OTHER PUBLICATIONS

International Search Report dated Feb. 27, 2018 issued in corresponding PCT Application PCT/JP2017/042862 cites the patent documents above.
(Continued)

*Primary Examiner* — Gonzalo Laguarda
(74) *Attorney, Agent, or Firm* — NORTON ROSE FULBRIGHT US LLP

(57) ABSTRACT

An engine device including a common rail configured to store, at a high pressure, a fuel supplied by a fuel feed pump. The common rail includes a pressure reducing valve configured to discharge the fuel in the common rail to a fuel return pipe. The fuel return pipe extends from the pressure reducing valve to a position higher than the pressure reducing valve, and then extends to a position lower than the pressure reducing valve.

19 Claims, 14 Drawing Sheets

(51) Int. Cl.
*F02M 35/10* (2006.01)
*F02M 37/00* (2006.01)
*F02M 55/02* (2006.01)
*F02M 63/02* (2006.01)

(52) U.S. Cl.
CPC ...... *F02M 37/0052* (2013.01); *F02M 55/025* (2013.01); *F02M 63/0275* (2013.01); *F02M 2200/857* (2013.01)

(56) References Cited

U.S. PATENT DOCUMENTS

| | | | | |
|---|---|---|---|---|
| 6,866,025 B1 * | 3/2005 | Maass | F04B 1/0435 123/179.17 |
| 7,441,546 B2 * | 10/2008 | Mitsumata | F02M 63/0052 123/472 |
| 8,418,677 B2 * | 4/2013 | Okamoto | F02D 41/3845 123/456 |
| 8,821,608 B2 * | 9/2014 | Mitsuda | F01N 13/0097 422/177 |
| 2002/0152998 A1 * | 10/2002 | Katayama | F02B 61/045 123/514 |
| 2005/0115544 A1 | 6/2005 | Kim | |
| 2005/0205066 A1 | 9/2005 | Maegooya et al. | |
| 2009/0159049 A1 | 6/2009 | Sakagami et al. | |
| 2011/0277731 A1 | 11/2011 | Kajita | |
| 2018/0128219 A1 * | 5/2018 | Kapp | F02M 37/04 |

FOREIGN PATENT DOCUMENTS

| | | | | |
|---|---|---|---|---|
| JP | H02050168 | U | | 4/1990 |
| JP | H10266925 | A | | 10/1998 |
| JP | 2004-108267 | A | | 4/2004 |
| JP | 2005-264846 | A | | 9/2005 |
| JP | 2006-299871 | A | | 11/2006 |
| JP | 2007-139098 | A | | 6/2007 |
| JP | 2007224812 | A | | 9/2007 |
| JP | 4074860 | B2 | | 4/2008 |
| JP | 2009-150317 | A | | 7/2009 |
| JP | 2010-163878 | A | | 7/2010 |
| JP | 2010229990 | A | | 10/2010 |
| JP | 2011012573 | A | | 1/2011 |
| JP | 2011017257 | A | | 1/2011 |
| JP | 2012127252 | A | * | 7/2012 |
| JP | 2015-68220 | A | | 4/2015 |
| JP | 2015068217 | A | | 4/2015 |
| JP | 2016-94886 | A | | 5/2016 |
| KR | 10-2005-0039901 | A | | 5/2005 |
| KR | 10-2006-0043611 | A | | 5/2006 |

OTHER PUBLICATIONS

European Search Report dated Feb. 14, 2020 issued in EP Application No. 17903770.0.

Japanese Office Action dated May 19, 2020 issued in JP Application No. 2017061510.

Japanese Office Action dated Jan. 31, 2023 issued in JP Application No. 2022073361.

Japanese Office Action dated May 14, 2024 issued in JP Application No. 2023-134764.

Korean Office Action dated Jan. 9, 2024 issued in KR Application No. 10-2023-7032284.

* cited by examiner

COMMON RAIL
ENGINE CONTROLLER
FUEL TANK
200
216
218
206
205
208
209
207
17
17a
219
16
601
211
212
213
204
600
604
602
214
15
201
217
215
202
203
210

18
34
218b
218c
27
219a
218a
216
16
7
217a
28
206
217
204
614
207
215
29
207
602
15
209
25a
207
604
207
614
213
214
6
221
211
13
26
2
3
25

ENGINE DEVICE INCLUDING AN ORIENTATION OF A FUEL RETURN LINE ATTACHED TO A COMMON RAIL

CROSS REFERENCES TO RELATED APPLICATIONS

This application is a national stage application pursuant to 35 U.S.C. § 371 of International Application No. PCT/JP2017/042862, filed on Nov. 29, 2017 which claims priority under 35 U.S.C. § 119 to Japanese Patent Application No. 2017-061510 filed on Mar. 27, 2017, the disclosures of which are hereby incorporated by reference in their entireties.

TECHNICAL FIELD

The present invention relates to an engine device including a common rail.

BACKGROUND ART

Diesel engines, in recent years, increasingly use common rails (e.g. see Patent Literatures 1, 2; hereinafter, PTL 1, PTL 2, respectively), to respond to exhaust gas regulation, an increased injection pressure for meeting increasing demands for low fuel consumption, and the like. A common rail stores, at a high pressure, a fuel supplied from a fuel tank. A pressure in the common rail is adjusted by a pressure reducing valve attached to the common rail. The fuel discharged through the pressure reducing valve is returned to the fuel tank through a fuel return pipe (also referred to as a leak pipe) connected to the pressure reducing valve.

CITATION LIST

Patent Literature

PTL 1: Japanese Patent No. 4074860

PTL 2: Japanese Patent Application Laid-Open No. 2007-139098

SUMMARY OF INVENTION

Technical Problem

In the common rail, a fuel lubricates a sliding part of the pressure reducing valve. To soak the sliding part of the pressure reducing valve in the fuel, the common rail is traditionally mounted to the engine device at a mounting angle (a direction in which a fuel return pipe connecting part protrudes) ranging from 45 to 90 degrees upward with respect to a horizontal line. In a case where the mounting angle is within a range of 0 to 45 degrees, the fuel return pipe is attached upward to the fuel return pipe connecting part. As should be understood from this, the direction of connecting the fuel return pipe to the common rail as well as the condition of mounting the common rail have been restricted.

A technical problem of the present invention is to provide an engine device that is improved based on studies on the existing circumstances as mentioned above.

Solution to Problem

An engine device according to an aspect of the present invention is an engine device including a common rail configured to store, at a high pressure, a fuel supplied by a fuel feed pump, wherein the common rail includes a pressure reducing valve configured to discharge the fuel in the common rail to a fuel return pipe, and the fuel return pipe extends from the pressure reducing valve to a position higher than the pressure reducing valve, and then extends to a position lower than the pressure reducing valve.

The engine device of the present invention may be such that: an exhaust-gas recirculation device configured to mix a part of exhaust gas discharged from an exhaust manifold into fresh air is coupled to an air-intake manifold provided in a cylinder head; the common rail is arranged below the air-intake manifold; and a midway portion of the fuel return pipe is attached to the exhaust gas recirculation device at a position higher than the pressure reducing valve.

Further, a fuel injection pipe extending from the common rail toward the cylinder head may pass between the cylinder head and the exhaust gas recirculation device.

Advantageous Effects of Invention

An engine device according to an aspect of the present invention is an engine device including a common rail configured to store, at a high pressure, a fuel supplied by a fuel feed pump, wherein the common rail includes a pressure reducing valve configured to discharge the fuel in the common rail to a fuel return pipe, and the fuel return pipe extends from the pressure reducing valve to a position higher than the pressure reducing valve, and then extends to a position lower than the pressure reducing valve. With this, the fuel can be stored between the pressure reducing valve and a portion of the fuel return pipe, which portion positioned higher than the pressure reducing valve, irrespective of the mounting angle of the common rail and the connecting direction of the fuel return pipe. This can achieve a state where the pressure reducing valve is soaked in the fuel, and can suppress or reduce abnormal abrasion of the sliding part of the pressure reducing valve. This relaxes the mounting condition of the common rail, and improves the degree of freedom in designing the engine device.

Further, the engine device according to the above aspect of the present invention may be such that: an exhaust-gas recirculation device configured to mix a part of exhaust gas discharged from an exhaust manifold into fresh air is coupled to an air-intake manifold provided in a cylinder head; the common rail is arranged below the air-intake manifold; and a midway portion of the fuel return pipe is attached to the exhaust-gas recirculation device at a position higher than the pressure reducing valve. With this, there is no need for providing the engine device with a member exclusively for supporting the midway portion of the fuel return pipe. Therefore, an increase in the manufacturing costs of the engine device can be suppressed or reduced. Further, with the common rail arranged below the air-intake manifold having a high rigidity, the common rail can be compactly arranged, and the common rail can be physically protected by keeping the common rail away from contacting a foreign matter from the above.

Further, a fuel injection pipe extending from the common rail toward the cylinder head may pass between the cylinder head and the exhaust gas recirculation device. Therefore, the fuel injection pipe can be protected by the exhaust gas recirculation device. Thus, deformation of the fuel injection pipe caused by another member contacting the fuel injection pipe or a foreign matter falling thereon during transportation of the engine device and the like can be suppressed or reduced, and a problem such as fuel leakage due to damages to the fuel injection pipe can be solved.

DESCRIPTION OF EMBODIMENTS

Figure 1:
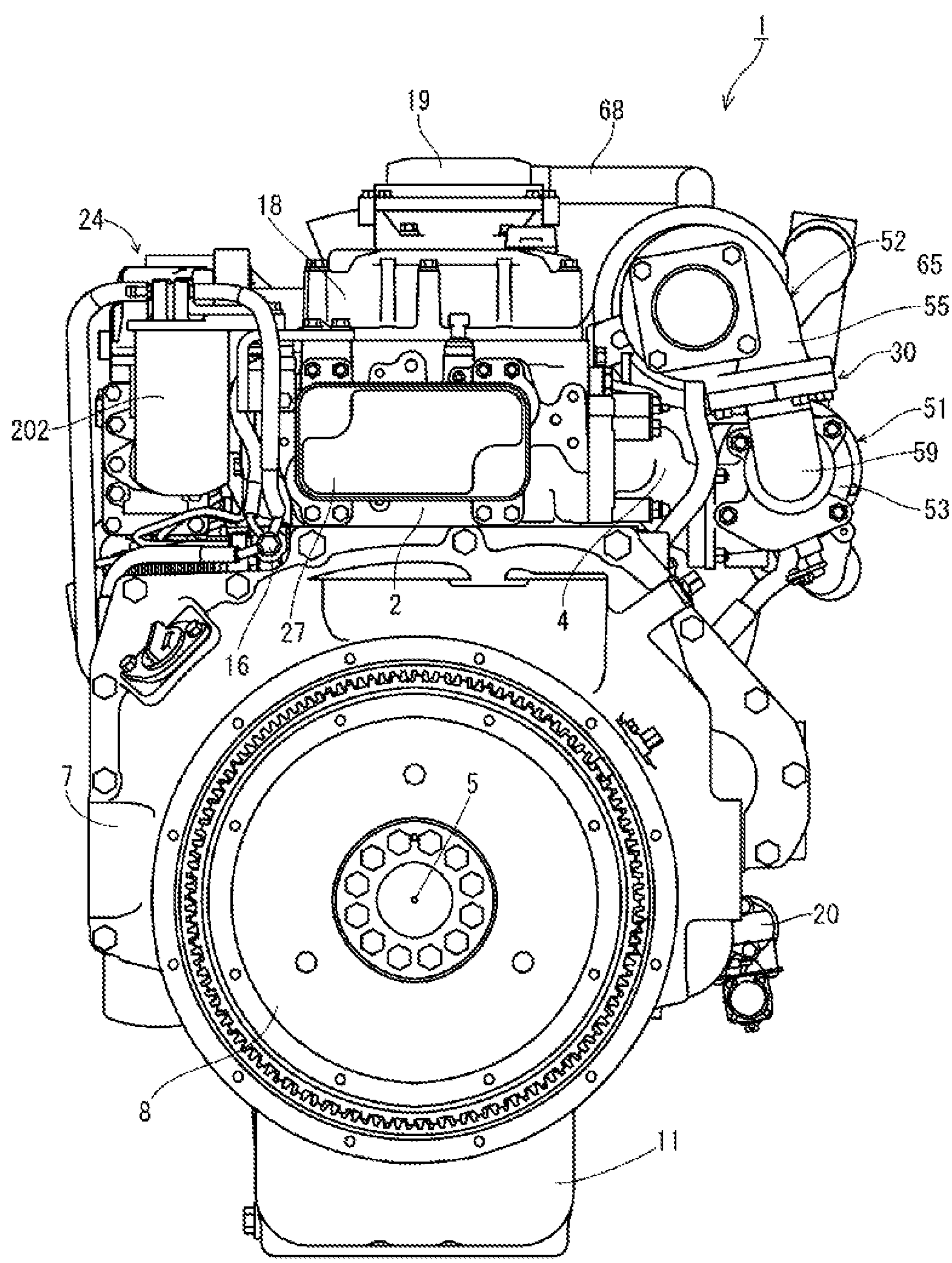
FIG. 1 A schematic front view of one embodiment of the engine device.

In the following, an embodiment of the present invention will be described with reference to the drawings. First, referring to FIG. 1 to FIG. 5, an overall structure of an engine 1 as an example of an engine device will be described. In this embodiment, the engine 1 is constituted by a diesel engine. In the descriptions on the engine 1 below, opposite side portions parallel to a crankshaft 5 (side portions on opposite sides relative to the crankshaft 5) will be defined as left and right, a side where a flywheel housing 7 is disposed will be defined as front, and a side where a cooling fan 9 is disposed will be defined as rear. For convenience, these are used as a benchmark for a positional relationship of left, right, front, rear, up, and down in the engine 1.

As shown in FIG. 1 to FIG. 5, an air-intake manifold 3 and an exhaust manifold 4 are disposed in one side portion and the other side portion of the engine 1 parallel to the crankshaft 5, respectively. In the embodiment, the air-intake manifold 3 is provided on a right side surface of a cylinder head 2 and is formed integrally with the cylinder head 2. The exhaust manifold 4 is provided on a left side surface of the cylinder head 2. The cylinder head 2 is mounted on a cylinder block 6 in which the crankshaft 5 and a piston (not shown) are disposed.

The crankshaft 5 has its front and rear distal ends protruding from the front and rear surfaces of the cylinder block 6. The flywheel housing 7 is fixed to one side portion of the engine 1 (in the embodiment, a front side surface side of the cylinder block 6) intersecting the crankshaft 5. In the flywheel housing 7, a flywheel 8 is disposed. The flywheel 8, which is fixed to the front end side of the crankshaft 5, is configured to rotate integrally with the crankshaft 5. Through the flywheel 8, power of the engine 1 is extracted to an actuating part of a work machine (for example, a hydraulic shovel, a forklift, or the like). The cooling fan 9 is disposed in the other side portion of the engine 1 (in the embodiment, a rear surface side of the cylinder block 6) intersecting the crankshaft 5. A rotational force is transmitted from the rear end side of the crankshaft 5 to the cooling fan 9 through a belt 10.

An oil pan 11 is disposed on a lower surface of the cylinder block 6. A lubricant is stored in the oil pan 11. The lubricant in the oil pan 11 is suctioned by a lubricant pump (not shown) disposed on the side of the right side surface of the cylinder block 6, the lubricant pump being arranged in a coupling portion where the cylinder block 6 is coupled to the flywheel housing 7. The lubricant is then supplied to lubrication parts of the engine 1 through an oil cooler 13 and an oil filter 14 that are disposed on the right side surface of the cylinder block 6. The lubricant supplied to the lubrication parts is then returned to the oil pan 11. The lubricant pump is configured to be driven by rotation of the crankshaft 5.

Figure 4:
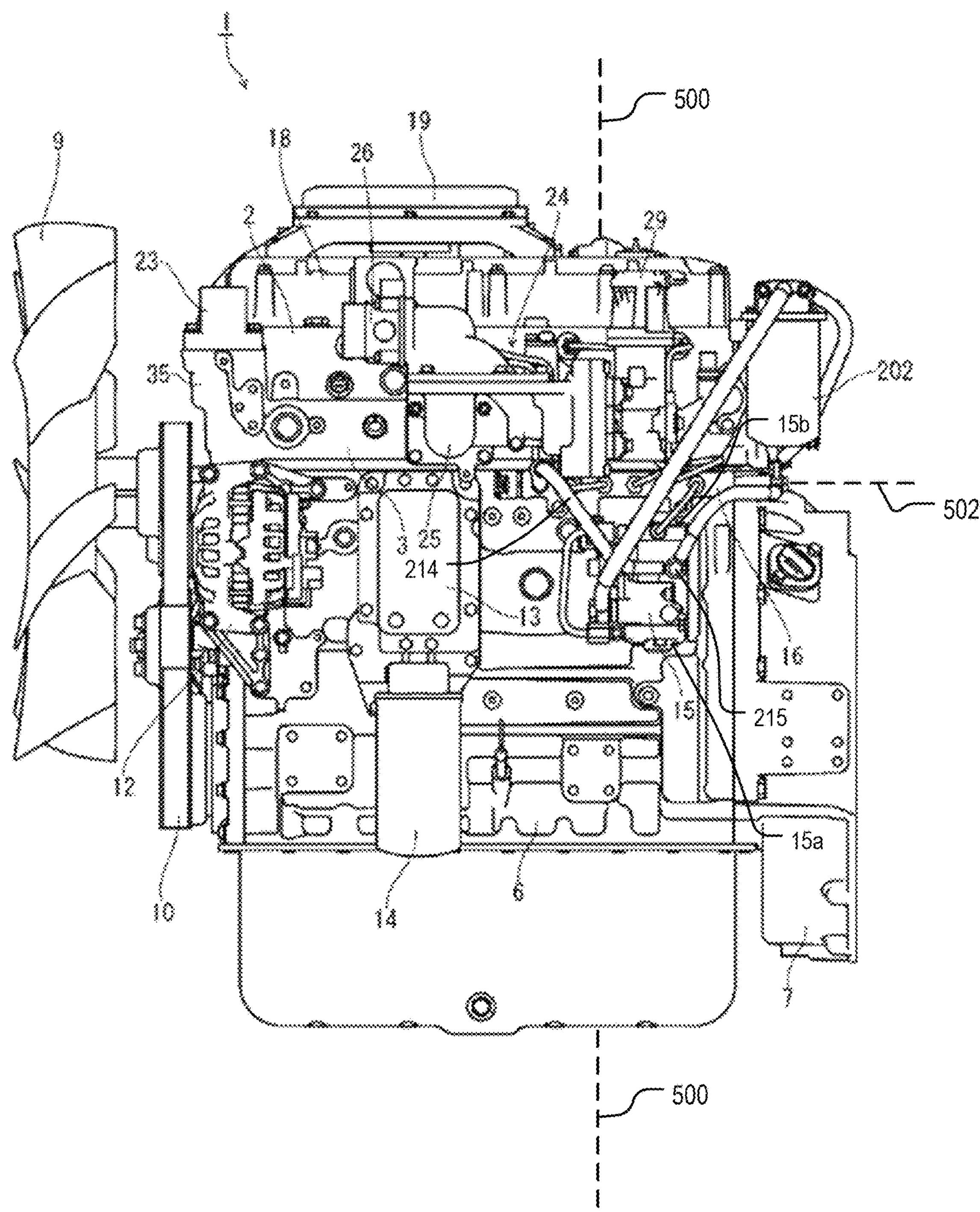
FIG. 4 A schematic right side view of the same embodiment.

As shown in FIG. 4, on the right side portion of the engine 1, a fuel feed pump 15 for feeding a fuel is attached in the coupling portion where the cylinder block 6 is coupled to the flywheel housing 7. The fuel feed pump 15 is arranged below an EGR device (exhaust gas recirculation device) 24. Further, between the air-intake manifold 3 and the fuel feed pump 15 of the cylinder head 2, a common rail 16 is arranged that extends in a longitudinal direction indicated by dashed line 502. Specifically, the fuel feed pump 15 includes a first side 15*a* and a second side 15*b* (see FIG. 7) and the common rail 16 is arranged between the second side 15*b* and the cylinder head 2 in the direction of dashed line 500. The dashed line 500 is perpendicular to dashed line 502 and extends through both the cylinder head 2 and the crankshaft 5. The common rail 16 is fixed to a portion close to the upper front of the right side surface of the cylinder block 6. Injectors 17 (see FIG. 6) for four cylinders are provided on an upper surface of the cylinder head 2 which is covered with a cylinder head cover 18. Each of the injectors has a fuel injection valve of electromagnetic-controlled type.

Each of the injectors 17 is connected to a fuel tank 201 (see FIG. 6) mounted on a work vehicle, through the fuel feed pump 15 and the common rail 16 and the like having a substantially cylindrical shape. A fuel in the fuel tank 201 is pressure-fed from the fuel feed pump 15 to the common rail 16, so that a high-pressure fuel is stored in the common rail 16. By controlling the opening/closing of the fuel injection valves of the injectors 17, the high-pressure fuel in the common rail 16 is injected from the injectors 17 to the respective cylinders of the engine 1.

Figure 2:
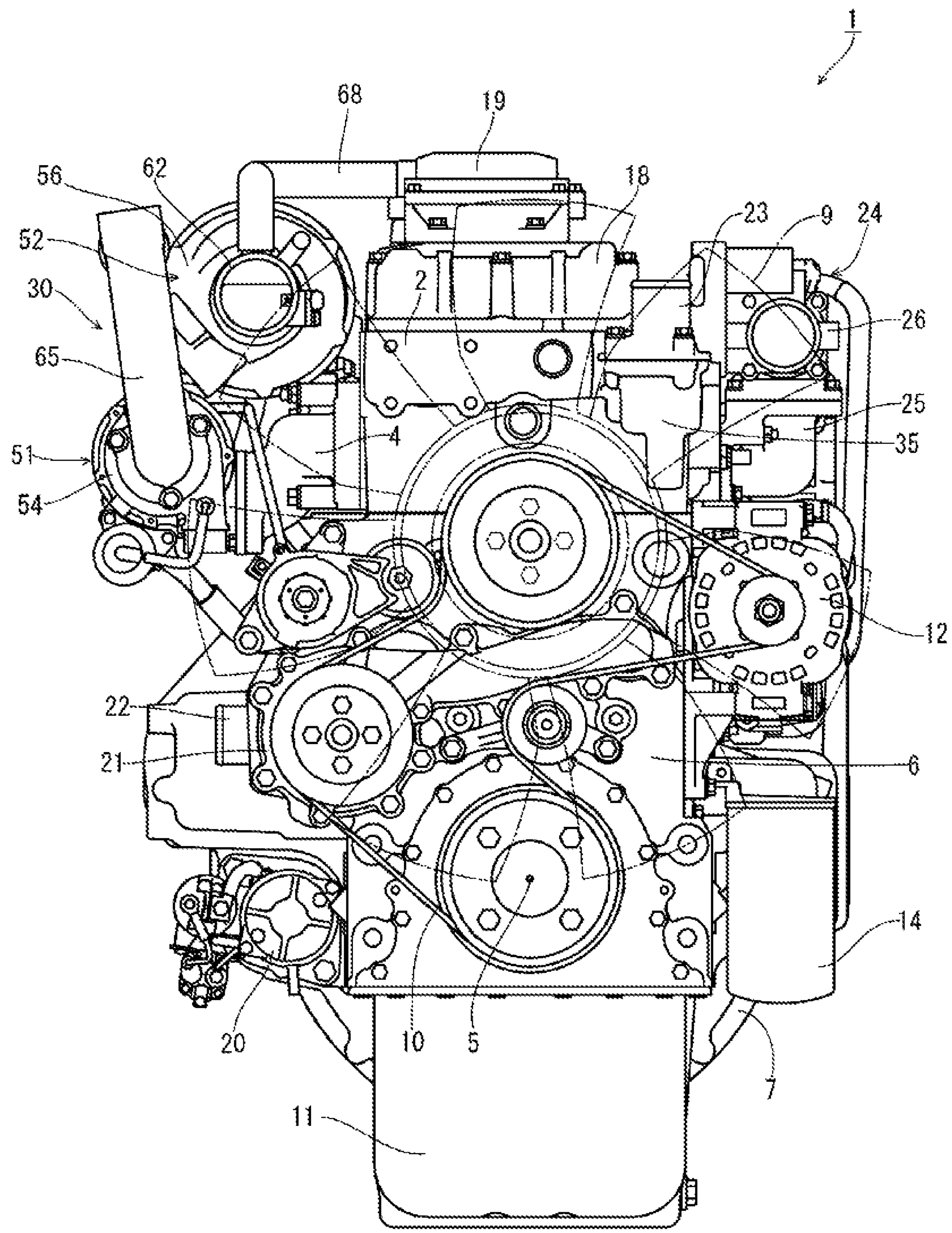
FIG. 2 A schematic rear view of the same embodiment.
Figure 5:
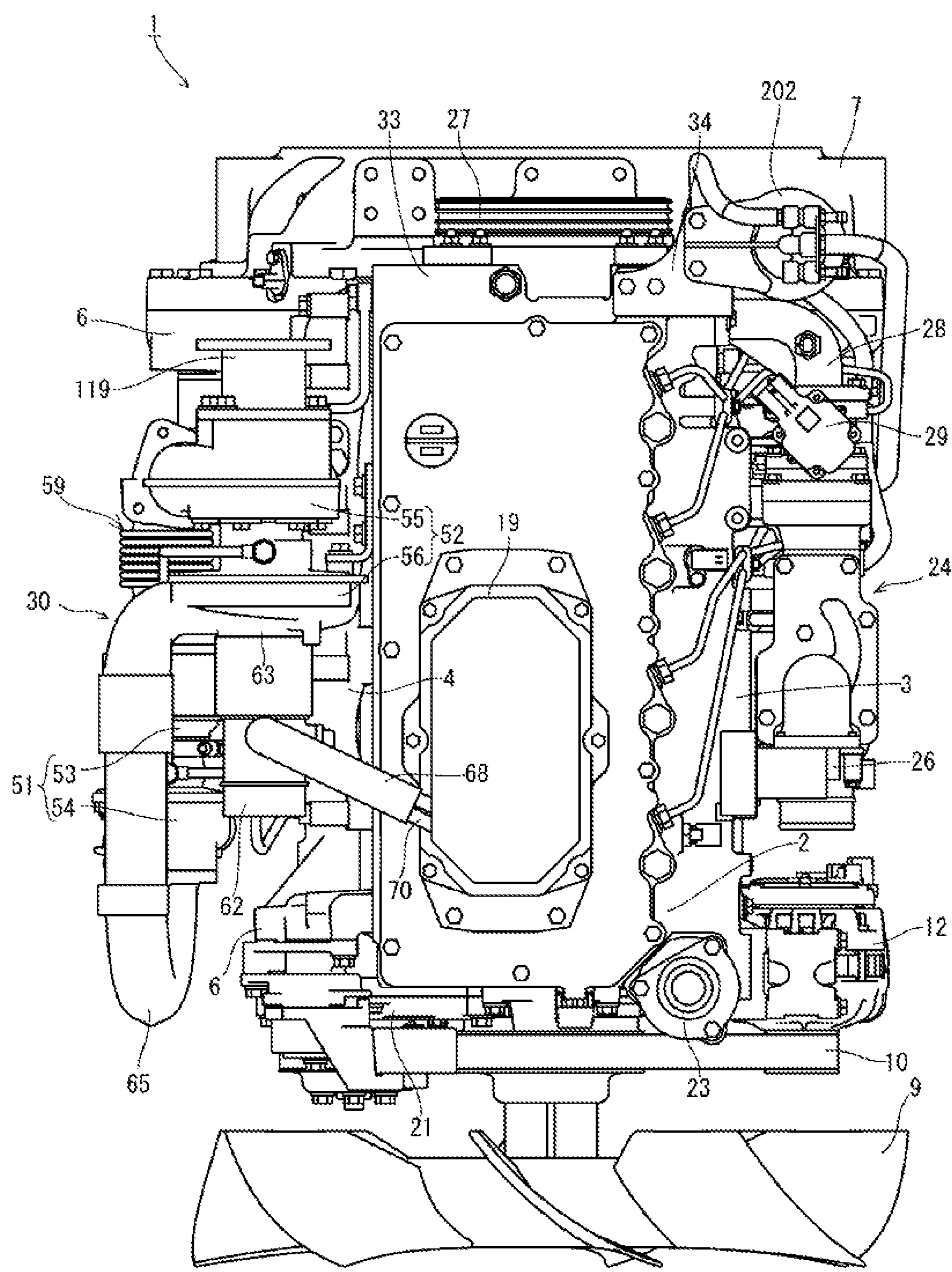
FIG. 5 A schematic plan view of the same embodiment.

As shown in FIG. 2 and FIG. 5, a blow-by gas recirculation device 19 is provided on an upper surface of the cylinder head cover 18 covering air-intake valves and exhaust valves (not shown), etc. disposed on the upper surface of the cylinder head 2. The blow-by gas recirculation device 19 takes in a blow-by gas that has leaked out of a combustion chamber of the engine 1 or the like toward the upper surface side of the cylinder head 2. A blow-by gas outlet of the blow-by gas recirculation device 19 is in communication with an intake part of a two-stage turbocharger 30 through a recirculation hose 68. The blow-by gas, from which a lubricant component is removed in the blow-by gas recirculation device 19, is then recirculated to the air-intake manifold 3 through the two-stage turbocharger 30 and the like.

Figure 3:
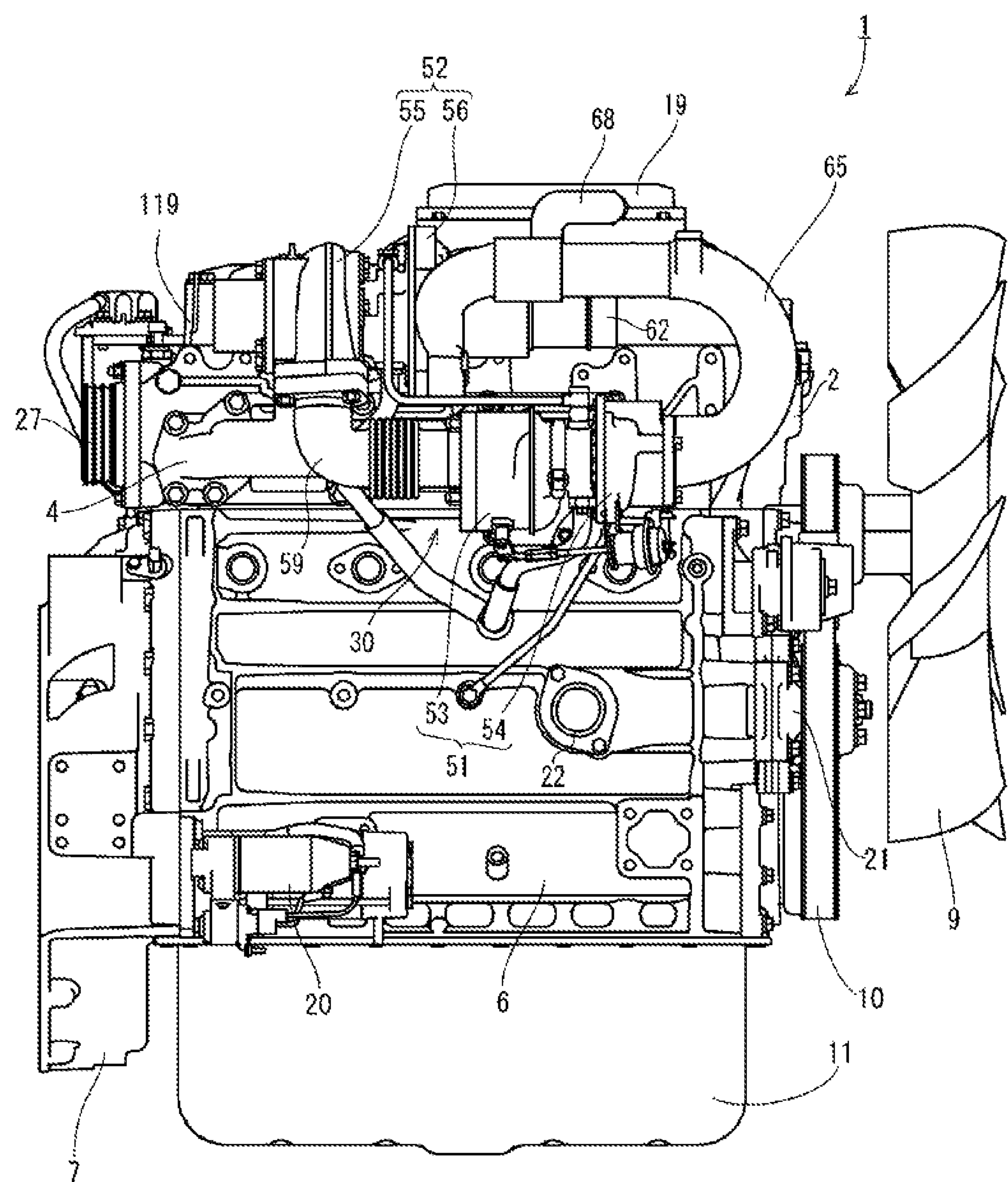
FIG. 3 A schematic left side view of the same embodiment.

As shown in FIG. 3, on the left side portion of the engine 1, an engine starter 20 is attached to the flywheel housing 7. The engine starter 20 is disposed below the exhaust manifold 4. The engine starter 20 is attached to a left portion of the rear surface of the flywheel housing 7, in a position below the coupling portion where the cylinder block 6 is coupled to the flywheel housing 7.

As shown in FIG. 2, a cooling water pump 21 for cooling water lubrication is provided in a portion close to the left of the rear surface of the cylinder block 6. Further, on the right lateral side of the cooling water pump 21, an alternator 12 serving as an electric power generator configured to generate electric power with power of the engine 1 is provided. Rotary power is transmitted from the front end side of the crankshaft 5 to the cooling fan 9, the alternator 12, and the cooling water pump 21, through a belt 10. Driving the cooling water pump 21 causes cooling water in a radiator (not shown) mounted in the work vehicle to be supplied to the cooling water pump 21. The cooling water is then supplied into the cylinder head 2 and the cylinder block 6, to cool the engine 1.

As shown in FIG. 3, the cooling water pump 21 is disposed below the exhaust manifold 4. The cooling water inlet pipe 22 which is in communication with a cooling water outlet of the radiator is provided on the left side surface of the cylinder block 6 and is fixed at a height substantially equal to the height of the cooling water pump 21. A cooling water outlet pipe 23 that is in communication with the cooling water inlet of the radiator is fixed at a position close to the right rear portion of the upper surface of the cylinder head 2, as shown in FIG. 2 and FIG. 5. The cylinder head 2 has a cooling water drainage 35 at its right rear corner portion, and the cooling water outlet pipe 23 is installed on an upper surface of the cooling water drainage 35.

As shown in FIG. 4 and FIG. 5, the EGR device 24 is disposed on the right lateral side of the cylinder head 2. The EGR device 24 includes: a collector 25 serving as a relay pipe passage that mixes a recirculation exhaust gas of the engine 1 (an EGR gas from the exhaust manifold 4) with fresh air (outside air from the air cleaner), and supplies a mixed gas to the air-intake manifold 3; an air-intake throttle member 26 that communicates the collector 25 with the air cleaner; a recirculation exhaust gas pipe 28 that constitutes a part of a recirculation flow pipe passage connected to the exhaust manifold 4 via an EGR cooler 27; and an EGR valve member 29 that communicates the collector 25 with the recirculation exhaust gas pipe 28.

In the embodiment, the collector 25 of the EGR device 24 is coupled to the right side surface of the air-intake manifold 3 which is formed integrally with the cylinder head 2 to form the right side surface of the cylinder head 2. That is, an outlet opening of the collector 25 is coupled to an inlet opening of the air-intake manifold 3 provided on the right side surface of the cylinder head 2. An EGR gas inlet of the recirculation exhaust gas pipe 28 is coupled to an EGR gas outlet of the EGR gas passage provided in the cylinder head 2, in a position close to the front of the right side surface of the cylinder head 2. The EGR device 24 is fixed to the cylinder head 2, by attaching the collector 25 to the air-intake manifold 3, and attaching the recirculation exhaust gas pipe 28 to the cylinder head 2.

In the EGR device 24, the air-intake manifold 3 and the air-intake throttle member 26 for taking fresh air in are connected in communication with each other through the collector 25. With the collector 25, the EGR valve member 29 which leads to an outlet side of the recirculation exhaust gas pipe 28 is connected and communicated. The collector 25 is formed in a substantially cylindrical shape which is long in a front-rear direction. On a supplied-air inlet side (the front portion relative to the longitudinal direction) of the collector 25, the air-intake throttle member 26 is fastened by a bolt. A supplied-air exhaust side of the collector 25 is fastened, by a bolt, to the inlet side of the air-intake manifold 3. The EGR valve member 29 adjusts the opening degree of the EGR valve therein so as to adjust the supply amount of EGR gas to the collector 25.

In the collector 25, fresh air is supplied. Further, an EGR gas (a part of exhaust gas from the exhaust manifold 4) is supplied from the exhaust manifold 4 to the collector 25 through the EGR valve member 29. After the fresh air and the EGR gas from the exhaust manifold 4 are mixed in the collector 25, mixed gas in the collector 25 is supplied to the air-intake manifold 3. In this manner, the part of the exhaust gas discharged from the engine 1 to the exhaust manifold 4 is returned to the engine 1 from the air-intake manifold 3. Thus, the maximum combustion temperature at the time of high-load operation is reduced, and the amount of nitrogen oxide (NOx) from the engine 1 is reduced.

As shown in FIG. 1, FIG. 3 to FIG. 5, the EGR cooler 27 is fixed to the front side surface of the cylinder head 2. The cooling water and the EGR gas flowing in the cylinder head 2 flow into and out of the EGR cooler 27, and the EGR gas is cooled in the EGR cooler 27. A pair of left and right EGR cooler coupling portions 33, 34 for coupling the EGR cooler 27 is provided in a protruding manner to the front side surface of the cylinder head 2. The left EGR cooler coupling portion 33 protrudes forward at a left-front corner portion of the cylinder head 2. The right EGR cooler coupling portion 34 protrudes forward at a right-front corner portion of the cylinder head 2, a distance away from the left EGR cooler coupling portion 33. To the front side surfaces of the EGR cooler coupling portions 33, 34, the EGR cooler 27 is coupled. That is, the EGR cooler 27 is disposed on the front side of the cylinder head 2 and at a position above the flywheel housing 7 such that a rear side surface of the EGR cooler 27 and the front side surface of the cylinder head 2 are spaced from each other.

As shown in FIG. 1 to FIG. 3, and FIG. 5, the two-stage turbocharger 30 is disposed on the left lateral side of the cylinder head 2. The two-stage turbocharger 30 includes a high-pressure turbocharger 51 and a low-pressure turbocharger 52. The high-pressure turbocharger 51 includes a high-pressure turbine case 53 in which a turbine wheel (not shown) is provided and a high-pressure compressor case 54 in which a blower wheel (not shown) is provided. The low-pressure turbocharger 52 includes a low-pressure turbine case 55 in which a turbine wheel (not shown) is provided and a low-pressure compressor case 56 in which a blower wheel (not shown) is provided.

In the exhaust path of the two-stage turbocharger 30, the high-pressure turbine case 53 is connected to the exhaust manifold 4. To the high-pressure turbine case 53, the low-pressure turbine case 55 is connected through a high-pressure exhaust gas pipe 59. To the low-pressure turbine case 55, an exhaust communication pipe 119 is connected. The high-pressure exhaust gas pipe 59 is formed of a flexible pipe. In this embodiment, a part of the high-pressure exhaust gas pipe 59 is formed in a bellows shape.

To the exhaust communication pipe 119, a tail pipe (not shown) is connected through an exhaust gas purification device (not shown) and the like. The exhaust gas discharged from each cylinder of the engine 1 to the exhaust manifold 4 is emitted from the tail pipe to the outside through the two-stage turbocharger 30, the exhaust gas purification device, and the like.

In an air-intake path of the two-stage turbocharger 30, the low-pressure compressor case 56 is connected to the air cleaner through an air supply pipe 62, the high-pressure compressor case 54 is coupled with the low-pressure compressor case 56 through a low-pressure fresh air passage pipe 65, and the air-intake throttle member 26 of the EGR device 24 is connected to the high-pressure compressor case 54 through an intercooler (not shown). The fresh air (outside air) suctioned by the air cleaner is subjected to dust removal and purification in the air cleaner, and fed to the air-intake manifold 3 through the two-stage turbocharger 30, the intercooler, the air-intake throttle member 26, the collector 25, and the like, and then supplied to the respective cylinders of the engine 1.

Figure 6:
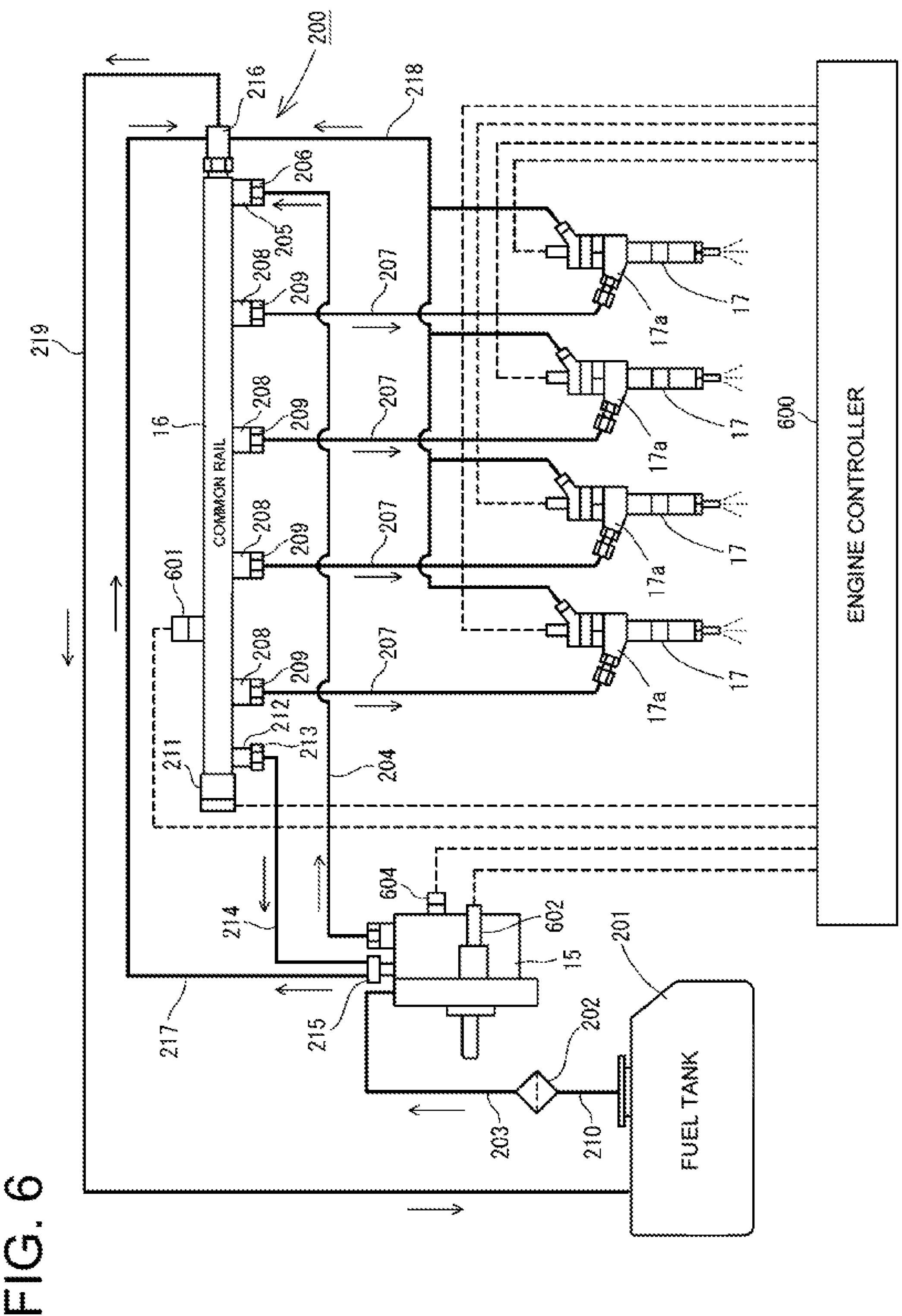
FIG. 6 An explanatory diagram of a fuel system of the same embodiment.

Next, the following describes a common rail system 200 and a fuel system structure of the engine 1, with reference to FIG. 6. The fuel tank 201 is connected to the injectors 17 for the four cylinders provided in the engine 1, through the fuel feed pump 15 and the common rail system 200. Each injector 17 has the fuel injection valve 17*a* of electromagnetic-controlled type. The common rail system 200 includes the common rail 16 having a substantially cylindrical shape.

The fuel tank 201 is connected to a suction side of the fuel feed pump 15 with interposition of a fuel feed pipe 210, a fuel filter 202, and a fuel feed low-pressure tube 203. On the other hand, the common rail 16 is connected to an ejection side of the fuel feed pump 15 with interposition of a fuel feed high-pressure tube 204. A high-pressure tube connecting part 205 is provided in a portion of the common rail 16, close to one end thereof relative to the longitudinal direction. An end portion of the fuel feed high-pressure tube 204 is coupled to the high-pressure tube connecting part 205 by screwing a high-pressure tube connector nut 206. The fuel in the fuel tank 201 is sucked into the fuel feed pump 15 through the fuel filter 202 and the fuel feed low-pressure tube 203, and is pressure-fed from the fuel feed pump 15 to the common rail 16 through the fuel feed high-pressure tube 204.

Further, the common rail 16 is connected to the injectors 17 of the four cylinders through four fuel injection pipes 207, respectively. In the longitudinal direction of the cylindrical common rail 16, fuel injection pipe connecting parts 208 for the four cylinders are arranged, spaced from one another. To each of the fuel injection pipe connecting parts 208, an end portion of the fuel injection pipe 207 is connected by screwing an injector pipe connector nut 209.

A pressure reducing valve 211 is attached to an end surface of the other end opposite to the one end of the common rail 16. The pressure reducing valve 211 discharges the fuel in the common rail 16 to a common rail surplus fuel return pipe 214 from a fuel return pipe connecting part 212 provided on the other end side of the outer circumferential surface of the common rail 16 through a fuel return pipe connection member 213. The common rail surplus fuel return pipe 214 connects the fuel return pipe connection member 213 to a return pipe joint member 215 for discharging a surplus fuel in the fuel feed pump 15.

On the end surface of the one end of the common rail 16, a return pipe joint member 216 for returning the surplus fuel is provided. To the return pipe joint member 216, the fuel discharged from the common rail 16 through an operation of the pressure reducing valve 211 and a surplus fuel of the fuel feed pump 15 are fed through the return pipe joint member 215 and a pump excess fuel return pipe 217. Further, to the return pipe joint member 216, the excess fuel of each injector 17 is fed through the injector excess fuel return pipe 218. The surplus fuel merged in the return pipe joint member 216 is collected in the fuel tank 201 through a fuel return pipe 219. Although illustration is omitted in FIG. 6, a midway portion of the fuel return pipe 219 is connected to a return pipe coupling part 220 (see FIG. 12) provided at an upper portion of the fuel filter 202.

A fuel pressure sensor 601 that detects a fuel pressure in the common rail 16 is provided in the common rail 16. Under control by an engine controller 600, the degree of opening of a suction metering valve 602 of the fuel feed pump 15 is adjusted, while the fuel pressure in the common rail 16 is monitored based on an output of the fuel pressure sensor 601. Thereby, with adjustment of the amount of fuel suctioned by the fuel feed pump 15, and thus with adjustment of the amount of fuel ejected by the fuel feed pump 15, the fuel in the fuel tank 201 is pressure-fed from the fuel feed pump 15 to the common rail 16, so that a high-pressure fuel is stored in the common rail 16.

Under control by the engine controller 600, opening/closing of each of the fuel injection valves 17*a* is controlled, so that the high-pressure fuel in the common rail 16 is injected from each injector 17 to each cylinder of the engine 1. That is, by electronically controlling each fuel injection valve 17*a*, an injection pressure, an injection timing, and an injection period (injection amount) of the fuel supplied from the injector 17 can be controlled with a high accuracy. Therefore, a nitrogen oxide (NOx) discharged from the engine 1 can be reduced, and noise and vibration of the engine 1 can be reduced. The pressure reducing valve 211 of an electromagnetic-driven type for adjusting the fuel pressure in the common rail 16 and a fuel temperature sensor 604 for detecting a fuel temperature in the fuel feed pump 15 are also electrically connected to the engine controller 600. Other devices as exemplified by various sensors provided in the engine 1 are also electrically connected to the engine controller 600, though not shown.

Next, the following describes a layout of the common rail 16 and therearound with reference to FIG. 7 to FIG. 13. The common rail 16 having a substantially cylindrical shape is attached to an upper portion of the right side surface of the cylinder block 6 relatively close to the front side such that a longitudinal direction of the common rail 16 is along the axial direction of the crankshaft 5 (see FIG. 1). The common rail 16 is disposed on the right side surface of the cylinder head 2, below the air-intake manifold 3 which is formed integrally with the cylinder head 2. The pressure reducing valve 211 is attached to the rear end portion of the common rail 16.

On the right side portion of the outer circumferential surface of the common rail 16, the high-pressure tube connecting part 205, the four fuel injection pipe connecting parts 208, and the fuel return pipe connecting part 212 are provided. These connecting parts 205, 208, 212 protrude toward the right lateral side, and in this embodiment, protrude substantially horizontally. That is, in this embodiment, the common rail 16 is attached to the engine 1 at a mounting angle of 0 degrees. The high-pressure tube connecting part 205 is arranged in a portion close to the front of the common rail 16. The fuel return pipe connecting part 212 is arranged in a portion close to the rear of the common rail 16. The four fuel injection pipe connecting parts 208 are arranged at equal intervals between the high-pressure tube connecting part 205 and the fuel return pipe connecting part 212.

Figure 7:
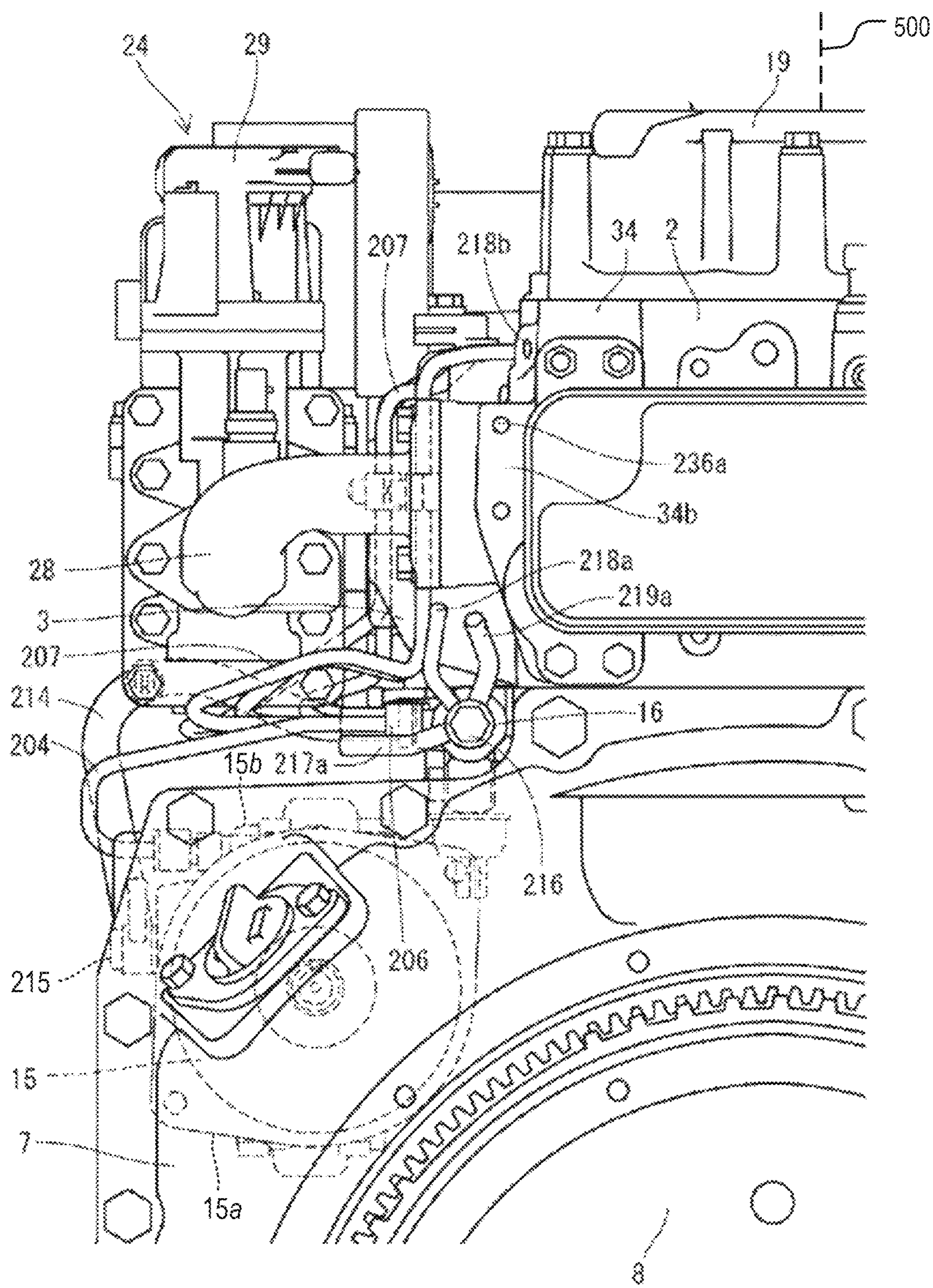
FIG. 7 A schematic front view enlarging and showing surroundings of a common rail of the same embodiment.
Figure 8:
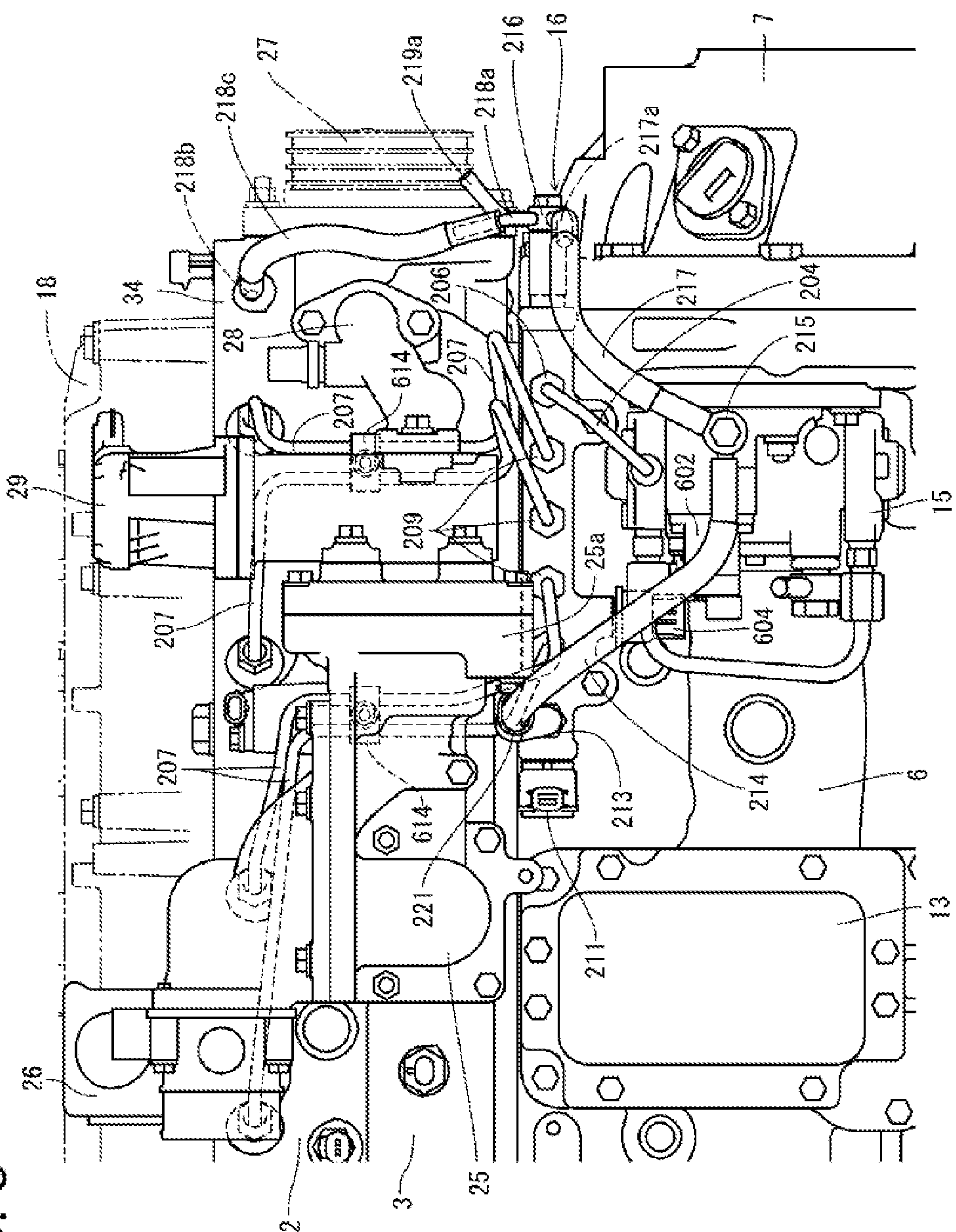
FIG. 8 A schematic left side view enlarging and showing the surroundings of the same common rail.
Figure 10:
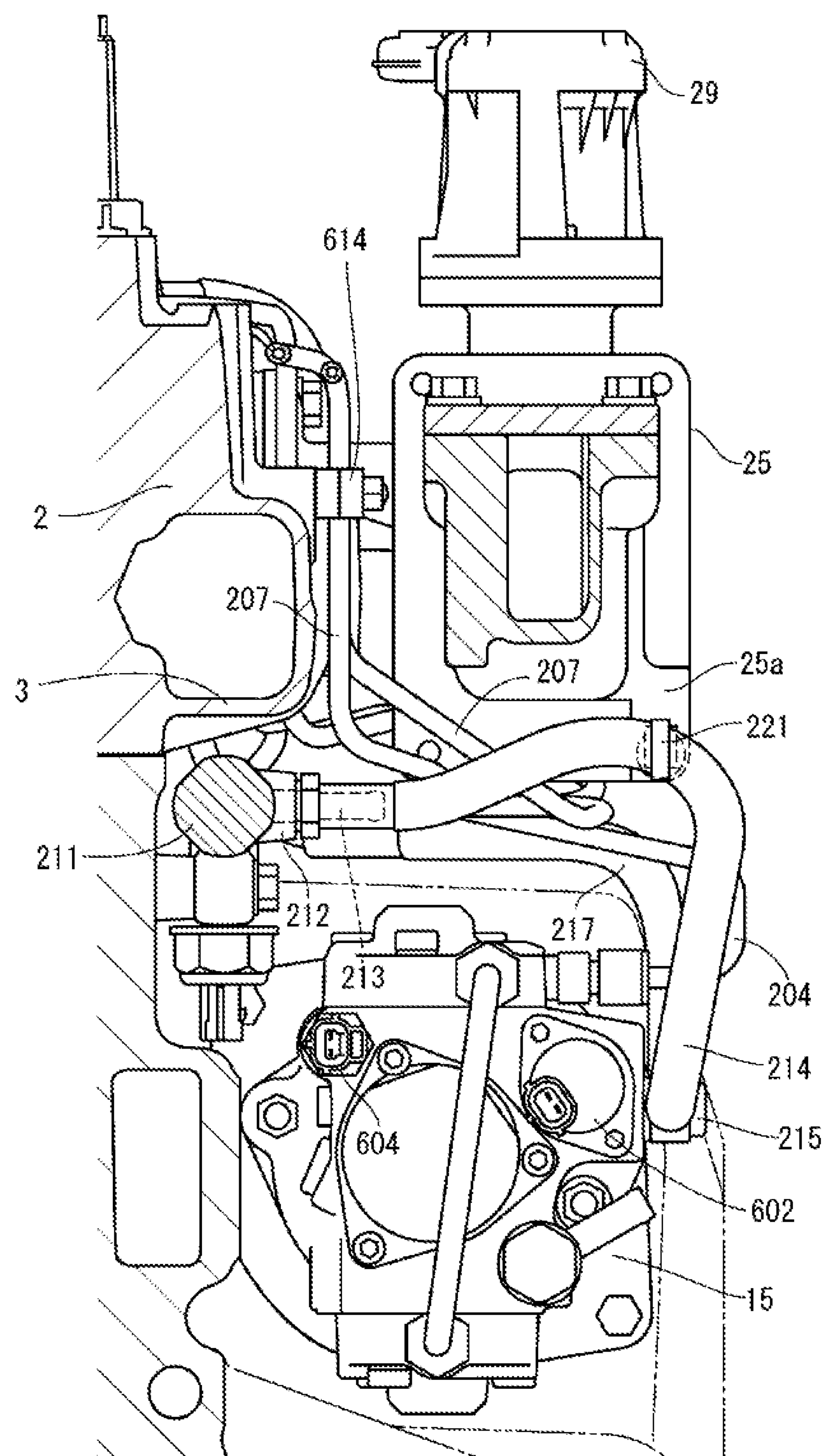
FIG. 10 A schematic rear view of the same embodiment taken at the position A-A of FIG. 9.

As shown in FIG. 10, the fuel return pipe connecting part 212 is connected to one end portion of the common rail surplus fuel return pipe 214 (upstream end portion of the flow of the fuel) through the fuel return pipe connection member 213. The fuel return pipe 214 extends from the fuel return pipe connecting part 212 horizontally to the right lateral side, and then is curved obliquely toward upper right to a position higher than the pressure reducing valve 211. In this embodiment, the fuel return pipe 214 extends to a position nearby the lower front portion of the collector 25 of the EGR device 24, and is attached by a pipe attachment part 221 to a back side lower right corner portion of a front flange part 25*a* of the collector 25. Further, the fuel return pipe 214 is curved in an obliquely lower front direction from a position nearby the lower front portion of the collector 25, and connected to the return pipe joint member 215 provided on the right side surface of the fuel feed pump 15. In this way, the connection point between the fuel return pipe 214 and the fuel feed pump 15 at the return pipe joint member 215 is located below the common rail 16 as shown in FIGS. 4, 7, and 8. For instance, the return pipe joint member 215 is located between the first side 15*a* and the second side 15*b* of the fuel feed pump 15 in the direction of dashed line 500. It should be noted that the fuel return pipe connection member 213 is attached to the fuel return pipe connecting part 212 so as to protrude substantially horizontally toward the right lateral side from the fuel return pipe connecting part 212.

In this embodiment, the common rail surplus fuel return pipe 214 extends from the pressure reducing valve 211 to a position higher than the pressure reducing valve 211, and then extends to a position lower than the pressure reducing valve 211. Therefore, the fuel can be stored between the pressure reducing valve 211 and the fuel return pipe 214 positioned higher than the pressure reducing valve 211, irrespective of the mounting angle of the common rail 16 and the direction of connecting the fuel return pipe 214 to the common rail 16. This can achieve a state where the pressure reducing valve 211 is soaked in the fuel, and can suppress or reduce abnormality abrasion of the sliding part of the pressure reducing valve 211. This relaxes the mounting condition of the common rail 16, and improves the degree of freedom in designing the engine 1.

Further, the midway portion of the fuel return pipe 214 is attached to the collector 25 of the EGR device 24, at a position higher than the pressure reducing valve 211. With this, there is no need for providing the engine 1 with a member exclusively for supporting the midway portion of the fuel return pipe 214. Therefore, an increase in the manufacturing costs of the engine 1 can be suppressed or reduced. Further, with the common rail 16 arranged below the air-intake manifold 3 having a high rigidity, the common rail 16 can be compactly arranged, and the common rail 16 can be physically protected by keeping the common rail 16 away from contacting a foreign matter from the above.

As shown in FIG. 7 to FIG. 10, a front end portion of the common rail 16 is arranged on the flywheel housing 7. To the front end portion of the common rail 16, the return pipe joint member 216 which is for returning the surplus fuel and which merges a plurality of fuel return paths is attached. The return pipe joint member 216 is arranged on the flywheel housing 7. With the one end portion (front end portion) of the common rail 16 arranged above the flywheel housing 7, an area of the right side surface of the cylinder block 6 occupied by a region of arranging the common rail 16 can be reduced, as compared to a structure in which the whole of the common rail 16 is arranged on the right side surface of the cylinder block 6. Therefore, the degree of freedom in laying out the other members on the right side surface of the cylinder block 6 can be improved. For example, in the engine 1 of this embodiment, the oil cooler 13 is arranged on the rear side of the common rail 16. By arranging the oil cooler 13 close to the air-intake manifold 3 and the EGR device 24, a compact arrangement of parts can be achieved.

As shown in FIG. 7, the return pipe joint member 216 includes: a connecting part 217*a* to which one end of the pump surplus fuel return pipe 217 is connected; a connecting part 218*a* to which one end of the injector surplus fuel return pipe 218 is connected; and a connecting part 219*a* to which one end of the fuel return pipe 219 (see FIG. 12) is connected. The return pipe joint member 216 is provided therein with an internal fluid passage (not shown) that connects the connecting parts 217*a*, 218*a*, 219*a*, and a fuel pressure regulating valve (not shown) arranged between the internal fluid passage and an internal space of the common rail 16.

Further, in the cylinder head 2, a surplus fuel outlet 218*b* (see FIG. 7) is provided in a portion nearby a corner portion where the right side surface and the front side surface of the cylinder head 2 cross each other. The surplus fuel outlet 218*b* is provided in a slightly upper portion of the front end portion of the right side surface of the cylinder head 2, and constitutes a part of the injector surplus fuel return pipe 218. The surplus fuel outlet 218*b* discharges the surplus fuel from the injectors 17 (see FIG. 6) in the cylinder head 2 to the outside of the cylinder head 2. Between the surplus fuel outlet 218*b* and the connecting part 218*a* of the return pipe joint member 216, an injector surplus fuel return pipe 218*c* is connected. The surplus fuel outlet 218*b* is connected to the surplus fuel outlet 218*b* (see FIG. 6) of each injector 17 through a surplus fuel passage (not shown) provided inside a side wall of the cylinder head 2.

Figure 9:
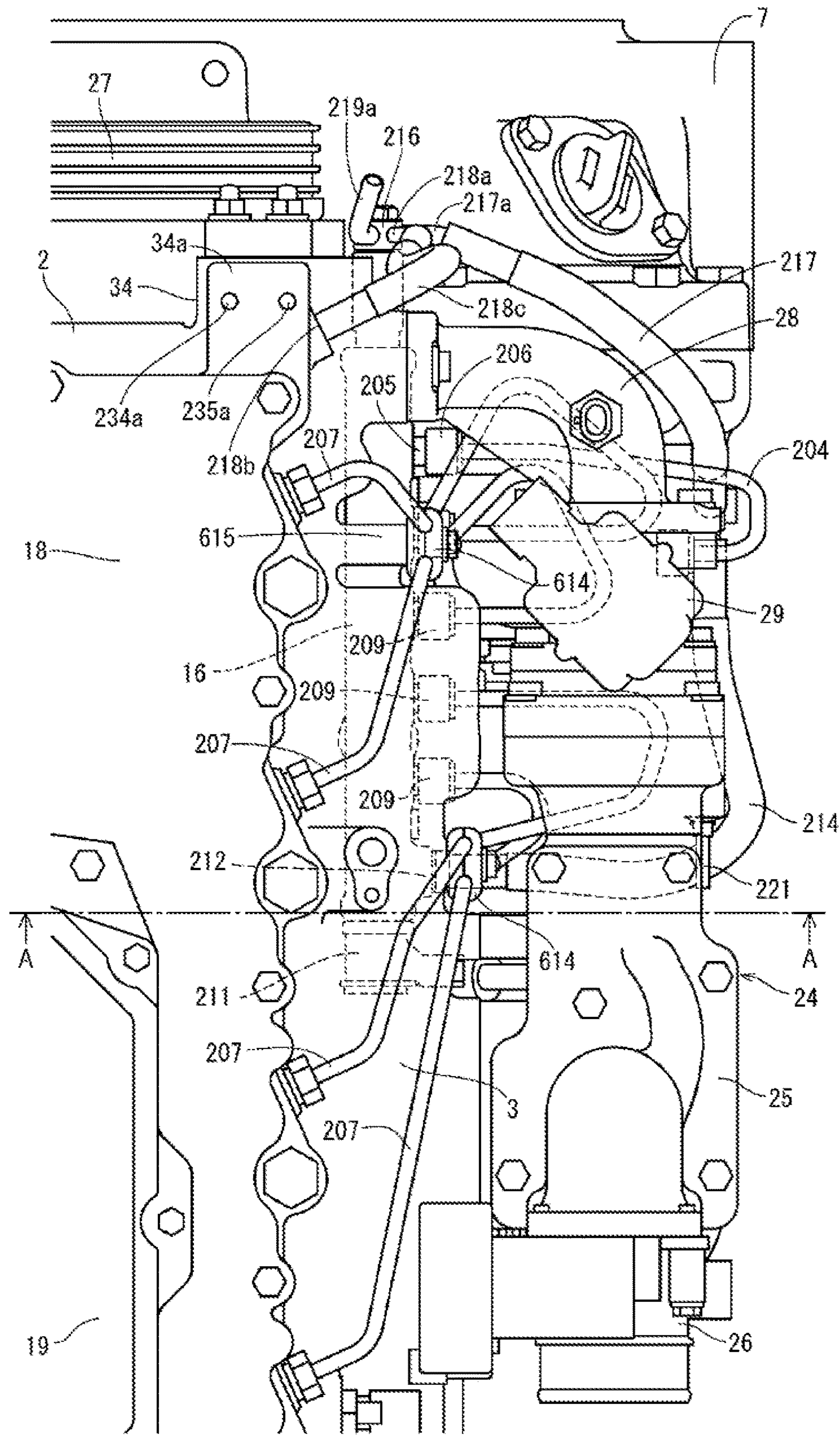
FIG. 9 A schematic plan view enlarging and showing the surroundings of the same common rail.
Figure 13:
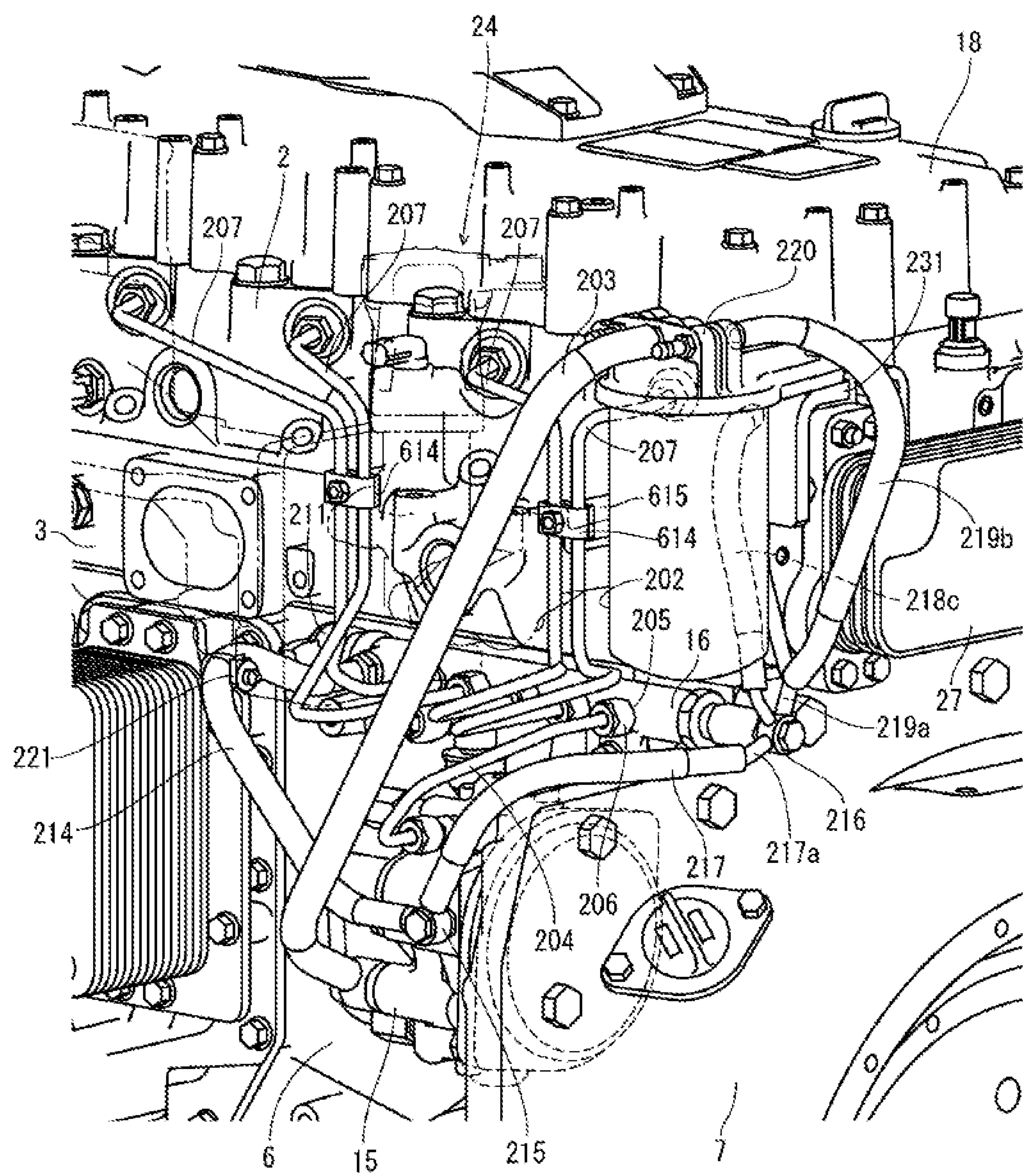
FIG. 13 A schematic perspective view enlarging and showing the surroundings of the right-front corner portion of the same embodiment.

As shown in FIG. 7 to FIG. 10, the four fuel injection pipes 207 attached to the four fuel injection pipe connecting parts 208 by the injector pipe connector nuts 209 extends from the fuel injection pipe connection units 208 to the right lateral side, and extends below the EGR device 24, respectively. Below the EGR device 24, each of the fuel injection pipes 207 is curved toward the cylinder block 6, and then curved upward to pass between the cylinder head 2 and the EGR device 24, and reach the right side surface of the cylinder head cover 18. As shown in FIG. 8, FIG. 9, and FIG. 13, midway portions of the four fuel injection pipes 207 are attached to the cylinder head 2 by a pair of front and rear fuel injection pipe fixtures 614, 614 attached to the right side surface of the cylinder head 2.

Each of the fuel injection pipe fixtures 614, 614 fixes two fuel injection pipes 207. The midway portions of the two fuel injection pipes 207 on the front side of the engine 1 are fixed, by the front side fuel injection pipe fixture 614, to an end surface of a protruding part 615 protruding from the right side surface of the cylinder head 2 at the front of the air-intake manifold 3 toward the right lateral side. The midway portions of the two fuel injection pipes 207 on the rear side of the engine 1 are fixed by the rear side fuel injection pipe fixture 614, to the right side surface of the air-intake manifold 3 which is integrally formed with the right side surface of the cylinder head 2.

Since each of the fuel injection pipes 207 passes between the cylinder head 2 and the EGR device 24, the fuel injection pipes 207 can be protected by the EGR device 24. Thus, deformation of the fuel injection pipes 207 caused by another member contacting the fuel injection pipes 207 or caused by a foreign matter falling thereon and the like during transportation of the engine 1 can be suppressed or reduced, and a problem such as fuel leakage due to damages to the fuel injection pipes 207 can be suppressed or reduced.

Further, since the midway portion of each fuel injection pipe 207 is fixed to the cylinder head 2, the fuel injection pipe 207 causes less vibration, and thus damages to the fuel injection pipe 207 due to vibration can be suppressed or reduced. Further, in this embodiment, the midway portions of two fuel injection pipes 207 out of the four fuel injection pipe 207, which are on the rear side of the engine 1, are fixed to the robust air-intake manifold 3 by the rear side fuel injection pipe fixture 614. Therefore, these fuel injection pipes 207 can be firmly fixed. In this embodiment, the air-intake manifold 3 is formed integrally with the cylinder head 2. Therefore, the fuel injection pipes 207 can be more firmly fixed.

As shown in FIG. 7 to FIG. 10, one end of the fuel feed high-pressure tube 204 which leads to the common rail 16 is connected to the upper right side surface of the fuel feed pump 15. The fuel feed high-pressure tube 204 extends toward the right lateral side from the upper right side surface of the fuel feed pump 15, and then curved obliquely upper front direction, and further curved toward a portion close to the front of the upper portion of the right side surface of the cylinder block 6. Then, the fuel feed high-pressure tube 204 passes below the EGR device 24, and extends to the high-pressure tube connecting part 205 of the common rail 16. The other end of the fuel feed high-pressure tube 204 is connected to the high-pressure tube connecting part 205 by a high-pressure tube connector nut 206.

Since the fuel feed high-pressure tube 204, the four fuel injection pipes 207, and the common rail surplus fuel return pipe 214 is below the EGR device 24, these parts are protected by the EGR device 24 against contact of a foreign matter from the upper side. This reduces damages to the fuel feed high-pressure tube 204, the fuel injection pipes 207, and the fuel return pipe 214, and improves the reliability of the engine 1.

As shown in FIG. 7 to FIG. 10, the high-pressure tube connecting part 205, the four fuel injection pipe connecting parts 208, and the fuel return pipe connecting part 212 protrude substantially horizontally toward the right lateral side, from the right side surface of the outer circumferential surface of the common rail 16. Further, there is no connecting part for connecting pipes is provided in the upper portion and the left side portion of the outer circumferential surface of the common rail 16. Therefore, the common rail 16 can be arranged below the air-intake manifold 3 and close to the right side surface of the cylinder block 6, thereby protecting the common rail 16 with the air-intake manifold 3, and the common rail 16 can be compactly arranged in the engine 1.

As shown in FIG. 5, FIG. 11 to FIG. 13, a fuel filter 202 is provided in an upper right front portion of the engine 1. The fuel filter 202 is arranged above a portion close to the right portion of the flywheel housing 7, and is attached to the right front corner portion of the cylinder head 2 through a filter attachment bracket 231. By arranging the fuel filter 202 in an open space above the flywheel housing 7, the fuel filter 202 can be compactly arranged in the engine 1, and compactification of the engine 1 can be achieved.

The upper left edge portion of the fuel filter 202 is fixed to the upper right front portion of the filter attachment bracket 231 with two front and rear bolts 232, 233. The filter attachment bracket 231 is fixed to the right EGR cooler coupling portion 34, by bolts 234, 235 attached to bolt attachment holes 234*a*, 235*a* (see FIG. 9) on the upper surface of the right EGR cooler coupling portion 34, and by a bolt 2346 attached to a bolt attachment hole 236*a* (see FIG. 7) on the front side surface of the right edge portion 34*a* of the right EGR cooler coupling portion 34. By fixing the filter attachment bracket 231 to the upper surface and the front side surface of the right EGR cooler coupling portion 34 of the cylinder block 6, the filter attachment bracket 231 can be firmly fixed to the cylinder block 6, and the fuel filter 202 can be firmly fixed to the cylinder block 6.

Figure 11:
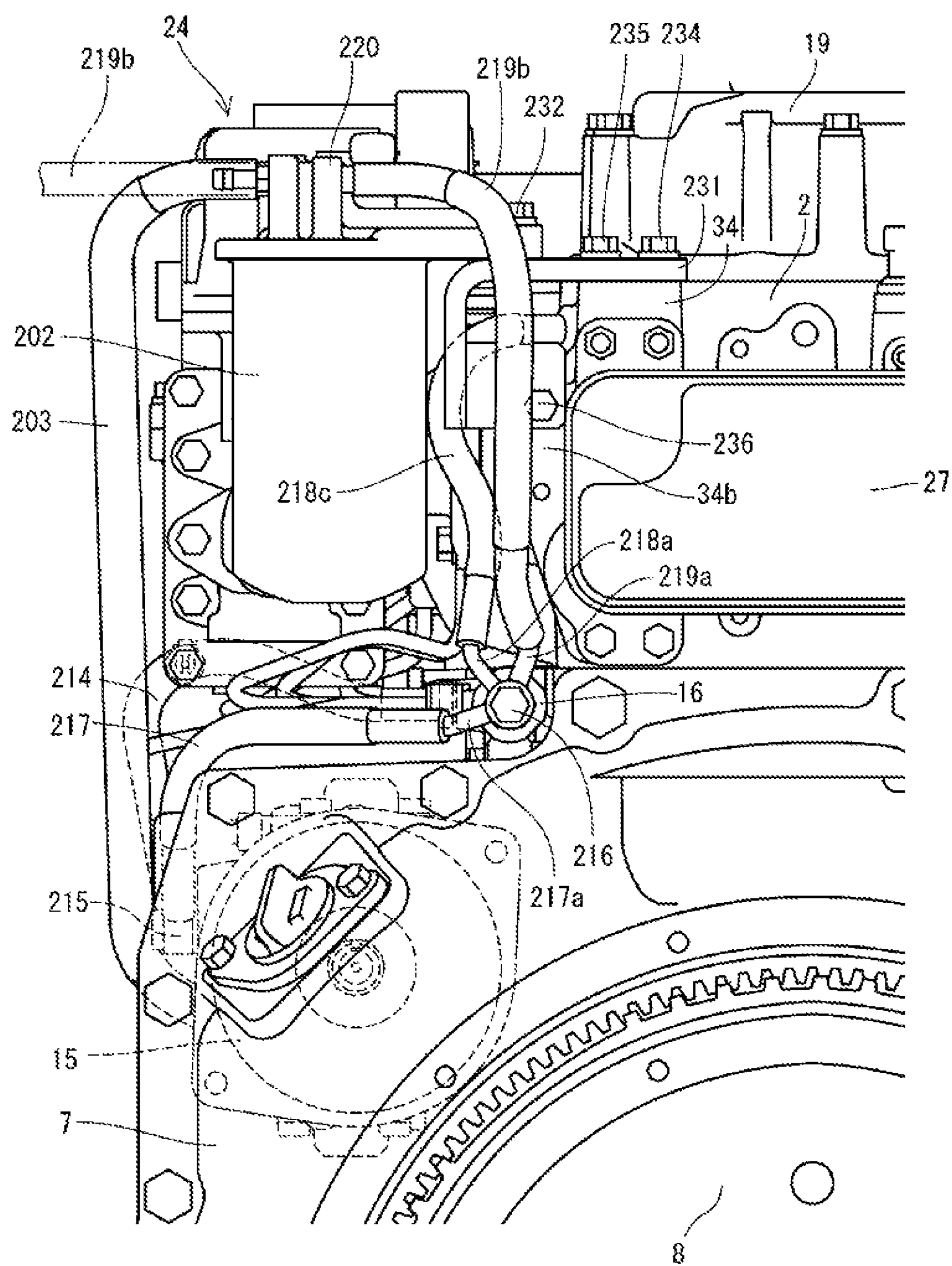
FIG. 11 A schematic front view enlarging and showing the surroundings of a right-front corner portion of the same embodiment.
Figure 12:
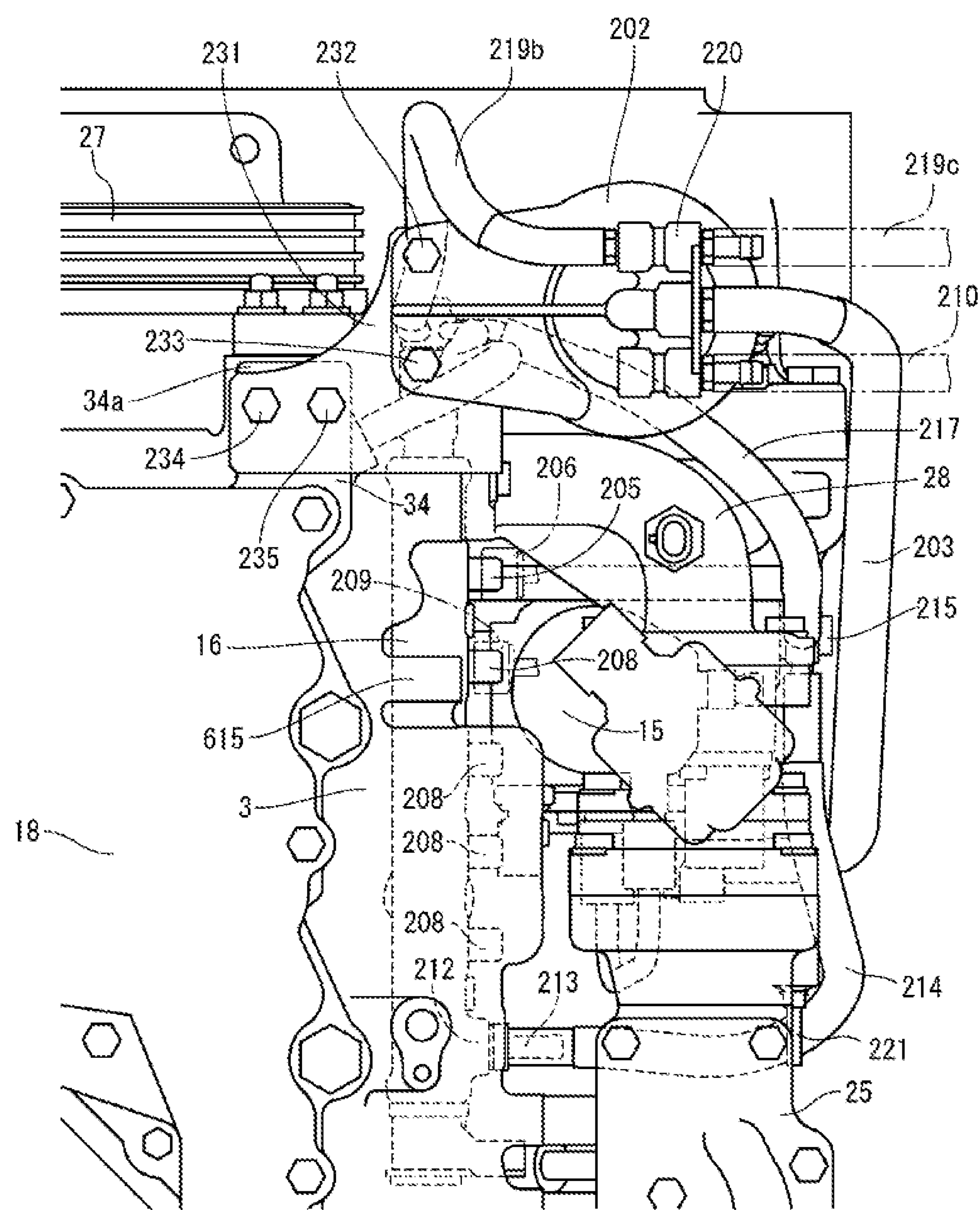
FIG. 12 A schematic plan view enlarging and showing the surroundings of the right-front corner portion of the same embodiment.

As shown in FIG. 11 to FIG. 13, the return pipe joint member 215 provided on the right side surface of the fuel feed pump 15 is connected to the connecting part 217*a* of the return pipe joint member 216 attached to the front end portion of the common rail 16 through the pump surplus fuel return pipe 217. The connecting part 218*a* of the return pipe joint member 216 is connected to the surplus fuel outlet 218*b* (see FIG. 7) provided in the right front corner portion of the cylinder head 2, through the injector surplus fuel return pipe 218*c* extended in the up-down direction. The connecting part 219*a* of the return pipe joint member 216 is connected to the fuel tank 201 (see FIG. 6), through an upstream fuel return pipe 219*b*, the return pipe coupling part 220 provided in an upper portion of the fuel filter 202, and a downstream fuel return pipe 219*c*. In the upper portion of the fuel filter 202, the fuel feed pipe 210 which leads to the fuel tank 201 and the fuel feed low-pressure tube 203 which leads to the lower portion of the right side surface of the fuel feed pump 15 are also connected.

In the engine 1 of this embodiment, the fuel feed pump 15, the common rail 16, and the fuel filter 202 are arranged in one corner portion (in this case, the right front corner portion) of the engine 1. Further, to the fuel return pipe connecting part 216 for returning surplus fuel, which is provided in one end portion (front end portion) of the common rail 16, the pump surplus fuel return pipe 217, the injector surplus fuel return pipe 218*c*, and the upstream fuel return pipe 219*b* are connected. This way, the fuel return pipes 217, 218*c*, 219*b* can be collectively arranged in one corner portion of the engine 1, and therefore these pipes can be shortened and simplified. Further, by collectively arranging the fuel feed pump 15, the common rail 16, and the fuel filter 202 in one corner portion of the engine 1, the pipes connecting these (the fuel feed low-pressure tube 203, the fuel feed high-pressure tube 204, and the common rail surplus fuel return pipe 214) can be shortened and simplified.

As shown in FIG. 10, an engine 1 is an engine device having a common rail 16 configured to store, at a high pressure, a fuel supplied by a fuel feed pump 15, wherein the common rail 16 includes a pressure reducing valve 211 configured to discharge the fuel in the common rail 16 to a fuel return pipe 214, and the fuel return pipe 214 extends from the pressure reducing valve 211 to a position higher than the pressure reducing valve 211, and then extends to a position lower than the pressure reducing valve 211. Therefore, the fuel can be stored between the pressure reducing valve 211 and a portion of the fuel return pipe 214, which portion positioned higher than the pressure reducing valve 211, irrespective of the mounting angle of the common rail 16 and the connecting direction of the fuel return pipe 214. This can achieve a state where the pressure reducing valve 211 is soaked in the fuel, and can suppress or reduce abnormal abrasion of a sliding part of the pressure reducing valve 211. This relaxes the mounting condition of the common rail 16, and improves the degree of freedom in designing the engine 1.

Figure 14:
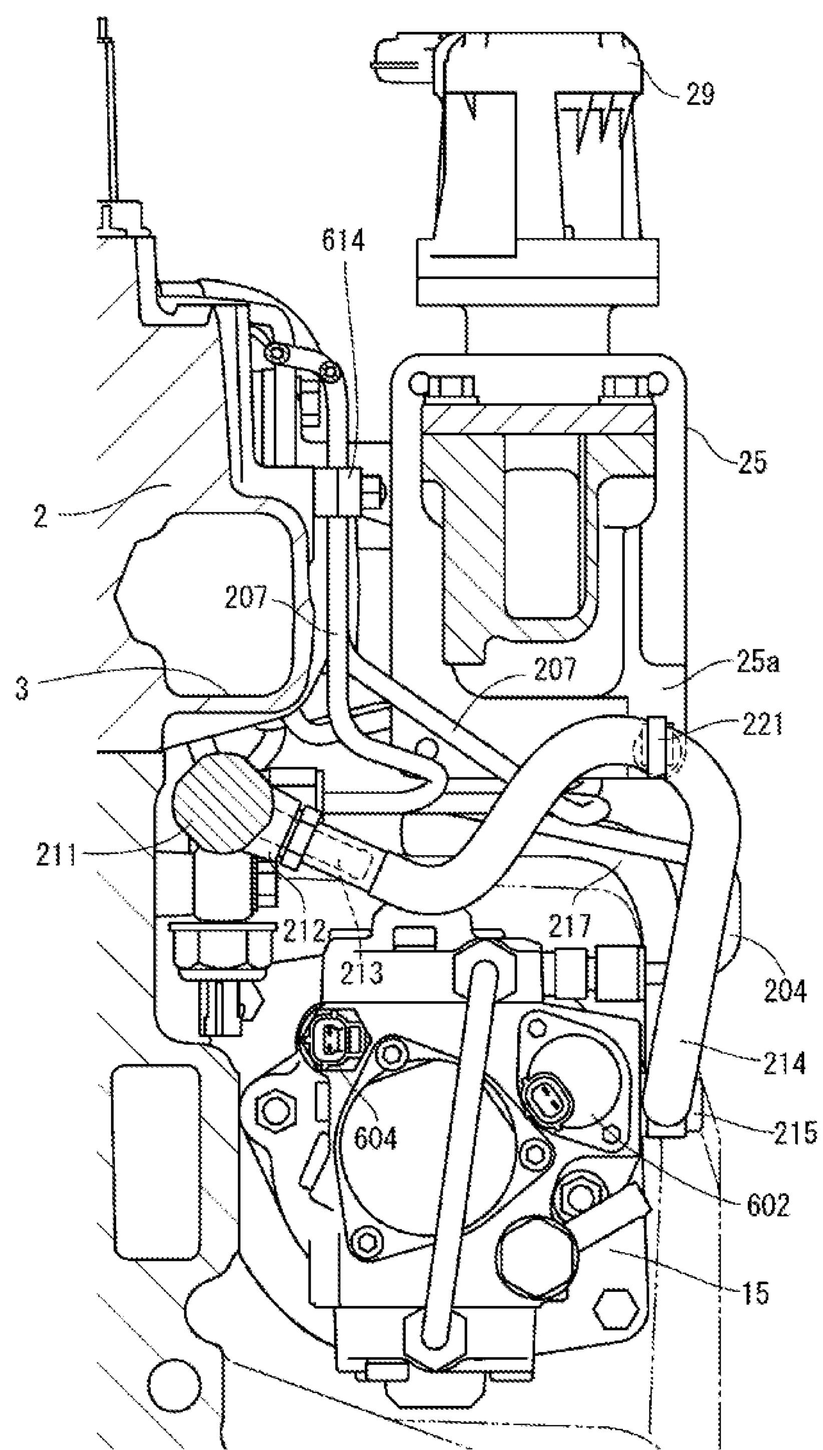
FIG. 14 A schematic rear view of another embodiment.

Although each connecting part of the fuel return pipe 214 in the common rail 16 (the fuel return pipe connecting part 212 and the fuel return pipe connection member 213)

protrudes substantially horizontally from the outer circumferential surface of the common rail 16, in the above-described embodiment, the direction in which the connecting part protrudes is not limited to this. For example, as shown in FIG. 14, the connecting part 212 and the connecting member 213 may protrude toward obliquely lower right from the outer circumferential surface of the common rail 16. In this embodiment, the fuel return pipe 214 extends obliquely downward from the common rail 16. In this embodiment, too, the fuel return pipe 214 extends from the pressure reducing valve 211 to a position higher than the pressure reducing valve 211, and then extends to a position lower than the pressure reducing valve 211. Therefore, the fuel can be stored between the pressure reducing valve 211 and a portion of the fuel return pipe 214, which portion positioned higher than the pressure reducing valve 211. This can achieve a state where the pressure reducing valve 211 is soaked in the fuel. As another modification, the fuel return pipe 214 may extend obliquely downward from the common rail 16, and extend to a position higher than the pressure reducing valve 211, and then to a position lower than the pressure reducing valve 211.

Further, as shown in FIG. 1 to FIG. 10, the engine 1 is such that: the common rail 16 is arranged below an air-intake manifold 3 provided to a cylinder head 2; an EGR device 24 configured to mix a part of exhaust gas discharged from the exhaust manifold 4 into fresh air is coupled to the air-intake manifold 3; and a midway portion of the fuel return pipe 214 is attached to the EGR device 24, at a position higher than the pressure reducing valve 211. With this, there is no need for providing the engine 1 with a member exclusively for supporting the midway portion of the fuel return pipe 214. Therefore, an increase in the manufacturing costs of the engine 1 can be suppressed or reduced. Further, with the common rail 16 arranged below the air-intake manifold 3 having a high rigidity, the common rail 16 can be compactly arranged, and the common rail 16 can be physically protected by keeping the common rail 16 away from contacting a foreign matter from the above.

Further, as shown in FIG. 1 to FIG. 10, since each of the fuel injection pipes 207, extending from the common rail 16 toward the cylinder head 2, passes between the cylinder head 2 and the EGR device 24, the fuel injection pipes 207 can be protected by the EGR device 24. Thus, deformation of the fuel injection pipes 207 caused by another member contacting the fuel injection pipes 207 or caused by a foreign matter falling thereon and the like during transportation of the engine 1 can be suppressed or reduced, and a problem such as fuel leakage due to damages to the fuel injection pipes 207 can be suppressed or solved.

The configurations of respective parts of the present invention are not limited to those of the illustrated embodiment, but can be variously changed without departing from the gist of the invention.

REFERENCE SIGNS LIST

1 engine (engine device)
2 cylinder head
2 air-intake manifold
4 exhaust manifold
15 fuel feed pump
16 common rail
24 EGR device (exhaust gas recirculation device)
207 fuel injection pipe
211 pressure reducing valve
214 common rail surplus fuel return pipe (fuel return pipe)

The invention claimed is:

1. An engine device comprising:
a cylinder head;
a crankshaft;
a common rail configured to store, at a high pressure, a fuel supplied by a fuel feed pump, wherein the fuel feed pump has a first side and a second side, wherein the second side is disposed between the first side and the common rail in a direction of a line perpendicular to a longitudinal direction of the common rail, wherein the line extends through both the cylinder head and the crankshaft; and
a fuel return pipe connected to the common rail and configured to return fuel in the common rail to the fuel feed pump,
wherein the fuel return pipe is directly connected to the fuel feed pump at a connection point that is located between the first side of the fuel feed pump and the common rail in the direction of the line.

2. The engine device according to claim 1, further comprising:
a common rail system that includes:
the common rail;
a pressure reducing valve coupled to the common rail and having a first side configured to receive the fuel from the common rail; and
the fuel return pipe that is distinct from the common rail, wherein the fuel return pipe is coupled to a second side of the pressure reducing valve via a first end of the fuel return pipe such that the fuel is discharged from the common rail into the first end of the fuel return pipe.

3. The engine device according to claim 2, wherein:
a second end of the fuel return pipe is coupled to the fuel feed pump such that the fuel is discharged from the second end of the fuel return pipe into the fuel feed pump,
the fuel discharged from the common rail into the fuel return pipe is discharged exclusively into the fuel feed pump, and
the fuel return pipe extends from the first end of the fuel return pipe that is coupled to the second side of the pressure reducing valve to a position higher than the first end of the fuel return pipe, without any portion of the fuel return pipe between the first end of the fuel return pipe and the position higher than the first end of the fuel return pipe extending lower than the first end of the fuel return pipe, and then extends to a position lower than the first end of the fuel return pipe.

4. The engine device according to claim 3, wherein:
the fuel return pipe extends from the first end of the fuel return pipe to the position higher than the first end of the fuel return pipe such that the pressure reducing valve of the common rail sustains contact with the fuel on a fuel return pipe side of the pressure reducing valve, or
the fuel return pipe extends from the first end of the fuel return pipe to the position higher than the first end of the fuel return pipe such that fuel is maintained in a portion of the fuel return pipe between the common rail and the position higher than the first end of the fuel return pipe.

5. The engine device according to claim 3, wherein the fuel return pipe extends from the first end of the fuel return pipe to the position higher than the first end of the fuel return pipe such that fuel is maintained in a portion of the fuel return pipe that extends from the first end of the fuel return pipe to the position higher than the first end of the fuel return pipe irrespective of a mounting angle of the common rail, a direction of connecting the fuel return pipe to the common rail, or a combination thereof.

6. The engine device of according to claim 3, wherein the pressure reducing valve includes a sliding portion, and where the fuel return pipe extends from the first end of the fuel return pipe to the position higher such that the pressure reducing valve is soaked in fuel to suppress or reduce abrasion of the sliding portion.

7. The engine device according to claim 3, wherein the second end of the fuel return pipe is coupled directly to the fuel feed pump via a connector, the connector interposed between the second end of the fuel return pipe and the fuel feed pump, such that the fuel is discharged from the second end of the fuel return pipe directly into the connector and thereafter into the fuel feed pump.

8. The engine device according to claim 7, wherein a first portion of the connector is coupled to the fuel feed pump, a second portion of the connector is coupled to the fuel return pipe, and a third portion of the connector is coupled to a second pipe.

9. The engine device according to claim 7, wherein the fuel return pipe extends continuously from the first end to the second end.

10. The engine device according to claim 2, wherein the pressure reducing valve is positioned at an end of the common rail.

11. The engine device according to claim 2, wherein an end of a connector is configured to be inserted into the fuel return pipe via the first end of the fuel return pipe.

12. The engine device according to claim 2, wherein:

the entirety of the fuel return pipe extends between the first end of the fuel return pipe and a second end of the fuel return pipe;

the first end of the fuel return pipe defines a first opening of the fuel return pipe;

the second end of the fuel return pipe defines a second opening of the fuel return pipe; and the fuel return pipe defines a flow path between the first opening and the second opening.

13. The engine device according to claim 2, wherein the pressure reducing valve is coupled to the common rail at a first end of the common rail, the common rail system further including:

a second fuel return pipe that is distinct from the common rail, wherein a first end of the second fuel return pipe is coupled to the fuel feed pump such that fuel is discharged from the fuel feed pump into the first end of the second fuel return pipe, and wherein a second end of the second fuel return pipe is coupled to a connector coupled to the common rail at a second end of the common rail opposite the first end of the common rail such that fuel is discharged from the second end of the second fuel return pipe into the connector.

14. The engine device according to claim 13, wherein the second end of the fuel return pipe is coupled to a first portion of a second connector, wherein the first end of the second fuel return pipe is coupled to a second portion of the second connector, and wherein the fuel feed pump is coupled to a third portion of the second connector.

15. The engine device according to claim 13, the common rail system further including:

a fuel feed pipe, wherein a first end of the fuel feed pipe is coupled to the fuel feed pump such that high-pressure fuel is discharged from the fuel feed pump into the first end of the fuel feed pipe, wherein a second end of the fuel feed pipe is coupled to the common rail at the second end of the common rail such that the high-pressure fuel is discharged from the second end of the fuel feed pipe into the common rail.

16. The engine device according to claim 1, further comprising a cylinder block that is provided on a lower side of the engine device, wherein the cylinder head is provided on an upper side of the engine device.

17. The engine device according to claim 1, wherein the fuel feed pump is connected to a fuel tank through a fuel supply pipe.

18. An engine device comprising:

a fuel feed pump;

a common rail configured to store, at a high pressure, a fuel supplied by the fuel feed pump;

a fuel feed pipe connected to the fuel feed pump and configured to supply fuel in the fuel feed pump to the common rail;

a fuel return pipe connected to the fuel feed pump at a separate connection point than the fuel feed pipe is connected and configured to return fuel in the fuel feed pump to a connector coupled to the common rail;

a second fuel return pipe connected to the common rail and configured to return fuel in the common rail to the fuel feed pump; and a third fuel return pipe connected to the common rail and configured to return fuel in the common rail to a fuel tank.

19. An engine device comprising:

a fuel feed pump connected to a fuel tank through a fuel supply pipe;

a common rail configured to store, at a high pressure, a fuel supplied by the fuel feed pump;

a pressure reducing valve coupled to a first end of the common rail and having a first side configured to receive the fuel from the common rail;

a fuel return pipe that is distinct from the common rail and configured to return fuel in the common rail to the fuel feed pump, wherein the fuel return pipe is coupled to a second side of the pressure reducing valve via a first end of the fuel return pipe such that the fuel is discharged from the common rail into the first end of the fuel return pipe, and the fuel return pipe is connected to the fuel feed pump at a connection point that is located below the common rail without being connected to the fuel supply pipe; and a second fuel return pipe that is distinct from the common rail, wherein a first end of the second fuel return pipe is coupled to the fuel feed pump such that fuel is discharged from the fuel feed pump into the first end of the second fuel return pipe, and wherein a second end of the second fuel return pipe is coupled to a connector coupled to the common rail at a second end of the common rail opposite the first end of the common rail such that fuel is discharged from the second end of the second fuel return pipe into the connector.

* * * * *